United States Patent [19]

Katz

[11] Patent Number: 4,668,325
[45] Date of Patent: May 26, 1987

[54] METHOD OF PRODUCING COMPOSITE NON-DISTORTABLE NEEDLEPOINT CANVAS

[76] Inventor: Marcella M. Katz, 10573 Le Conte Ave., Los Angeles, Calif. 90024

[21] Appl. No.: 896,818

[22] Filed: Aug. 15, 1986

Related U.S. Application Data

[62] Division of Ser. No. 737,702, May 28, 1985, Pat. No. 4,623,573.

[51] Int. Cl.[4] .............................................. C09J 5/06
[52] U.S. Cl. .................................... 156/322; 156/324; 156/332; 428/109; 428/111; 428/131; 428/255
[58] Field of Search .................. 112/439; 428/89, 109, 428/110, 111, 131, 247, 255, 906.6, 542; 156/290, 291, 322, 324, 332

[56] References Cited

U.S. PATENT DOCUMENTS

| | | | |
|---|---|---|---|
| 3,762,984 | 10/1973 | Goldbeck | 428/255 X |
| 3,852,090 | 12/1974 | Leonard et al. | 428/246 |
| 4,110,138 | 8/1978 | Nomura et al. | 428/542 X |
| 4,122,227 | 10/1978 | Dean | 428/255 X |
| 4,328,270 | 5/1982 | Kostovski | 428/255 X |
| 4,450,196 | 5/1984 | Kamat | 156/291 X |
| 4,511,615 | 4/1985 | Ohta | 156/291 X |

Primary Examiner—Robert A. Dawson
Attorney, Agent, or Firm—Philip D. Junkins

[57] ABSTRACT

A composite laminated, non-distortable needlepoint canvas material comprised of a primary layer of non-elastic, open-mesh woven fabric having a uniform weave pattern of mesh apertures and a relatively thin secondary mesh-stabilizing layer of sheer non-elastic fabric material. The threads of the open-mesh primary layer are impregnated and coated with a synthetic resin mesh-stiffening material and are bonded to the sheer secondary layer by the synthetic resin mesh-stiffening material of the primary layer or by a combination of such mesh-stiffening material and an applied synthetic adhesive. The threads of the primary layer are not susceptible to raveling at the edges of the composite needlepoint material. The sheer fabric secondary layer may be a non-woven, semi-transparent, random-spun synthetic fiber material or a sheer closely woven fabric material.

9 Claims, 7 Drawing Figures

METHOD OF PRODUCING COMPOSITE NON-DISTORTABLE NEEDLEPOINT CANVAS

This is a division of my co-pending application Ser. No. 737,702 filed May 28, 1985, now U.S. Pat. No. 4,623,573.

BACKGROUND OF THE INVENTION

1. Field of the Invention

The present invention relates to needlepoint canvas and yardage. More particularly, the invention relates to open-mesh woven textile and fabric materials in which the holes or apertures between the natural or synthetic theads of the materials are equal to or larger in size than the threads themselves and are intended to receive needle-directed yarn stitches for the purpose of creating a stitchery design on such textiles and fabrics.

2. Description of the Prior Art

Needlepoint canvas, in its simplest form, is comprised of evenly spaced, durable warp and woof threads woven into a textile in which the holes or apertures between the threads are equal to or larger in size than the threads themselves. The canvas threads are usually composed of cotton or linen fibers, particularly where the gauge of the canvas (number of threads per inch) falls within the popular range of 10 to 18. The threads are composed of a number of fiber strands twisted together and covered with sizing (a stiffening agent such as starch). Fine gauge needlepoint fabrics normally have 18 to 40 threads per inch (sometimes up to 58 threads per inch) and are woven from silk or synthetic fiber threads in addition to cotton and linen fiber threads.

Textile and fabric materials, manufactured for use as needlepoint canvas, are usually woven in 24, 27, 36, 37, 40, 43 and 54 inch widths (sometimes also available in 60 and 72 inch widths) with the edges firmly woven as a narrow "selvage" band, and such materials are sold by their manufacturers in "bolt" (roll) units having a minimum of 5-10 yards of material. Fabrics manufactured for use as petit point canvas may be woven in 22 inch widths. The warp threads lie parallel to the selvage edges and the weft threads lie at right angles thereto.

The principal types of needlepoint canvases in use today are designated "mono-" meaning one thread on each side of each hole or aperture and "double" meaning two threads on each side of each major hole or aperture. There are two basic forms of mono-canvases, i.e., "mono-floating" and "mono-interlock." With mono-floating canvas (see FIG. 1) the warp and weft (woof) threads are merely woven over and under each other whereas with mono-interlock canvas (see FIG. 2) the warp threads (in fact) comprise two smaller (weaker) threads that are knotted or twisted at each over and under crossing of weft threads. Because of the weaving method, mono-floating canvases are subject to greater slippage between threads so that the mesh pattern of the canvas easily becomes distorted, i.e., the holes or apertures become of non-uniform size and configuration with repeated folding and needlepoint working of the canvas. After a great deal of handling even the best of canvases become limp. Further, mono-floating canvas pieces (cut from bolt yardage) are greatly subject to raveling (becoming unwoven) at the cut edges. Mono-interlock woven canvas is somewhat less subject to edge raveling. The smaller dual warp threads so weaken the total canvas that heavy sharp sizing starches are used to saturate the threads and provide body to the canvas. The increased quantities of sizing that are used to reinforce the smaller (weaker) warp threads render the canvas holes or apertures harsh and rough and thereby cause substantial needlepoint yarn wear and frequent yarn breakage, both during the needlepoint stitching process and afterwards while the needlepoint piece is in use. In performing needlepoint work, the body starch relaxes and flakes and the canvas itself experiences loss of stiffness and body. Overly stiff canvas becomes overly limp when worked. With the loss of body, mono-interlock canvas shifts and distorts and its weave pattern frequently interlocks the canvas distortions. Mono-interlock woven canvas is thereby more difficult to block or straighten when distorted out of shape through the application of needlepoint stitchery. Corrective blocking is frequently temporary. Thus, the canvas will often creep back into its pre-blocked distorted form and cannot be permanently blocked even by professional blockers.

Double thread needlepoint canvas (also referred to as "Duo" or "Penelope") is woven with the warp and woof threads that form the principal holes or apertures of the canvas each comprised of a pair of slightly spaced threads (see FIG. 3) which form small apertures. This weave of needlepoint canvas is useful when it is desired to use half stitches or where petit point stitches (small) and gross point stitches (large) are to be worked on the same canvas. In this instance, the canvas' woven structure permits shifting of warp and woof dual threads to make large and small aperture sizes. In other instances, as with the classic Aubusson tapestry stitch, the two vertical threads are not split to achieve a fine textured stitch but is rendered on double thread canvas without the tedium of separating the double vertical threads.

From time to time other forms of needlepoint canvas have been manufactured. For example, molded plastic, large gauge (4-10) mesh sheets, with a surface texture simulating the warp and woof thread configuration of woven needlepoint canvas, have been made. Such molded mesh sheets have been found to be stiff as a stitchwork material and thus have not found use for upholstery or traditional fine needlepoint applications.

Mono-floating and mono-interlock needlepoint canvases have continued to be used for most stitchery applications despite their many shortcomings and the problems they create for the needlepoint artisan. The principal shortcomings and problems include (as previously noted) edge raveling, canvas distortion, aperture irregularity and roughness, and thread shifting. Needlepoint pieces greatly vary in size from both width (24, 36, 40, 54 and 72 inches) and yardage lengths to small pieces (cut from bolt full width yardage) measuring only inches per side. Great care must be taken when cutting bolt or yardage canvas into smaller popular use size canvas pieces to make certain that each cutting course or line follows a single line or canvas holes or apertures, i.e., between warp and woof threads, so that edge raveling is minimized. Wide widths of canvas are particularly difficult to cross-cut following an exact minute woof line. In most cases the needlepoint artisan cuts the canvas so that a wide border area (outside of the proposed stitchery design and background area) is provided and a band of the boarder canvas is folded under and bound, taped and/or cemented with adhesive to the underside of the canvas to prevent raw edge raveling. In other cases the canvas is held along its edge portions in a bulky and rigid frame which is often awkward or inconvenient to carry from place to place where the artisan desires to perform needlework. For any shaping or reshaping of the canvas after the application of needlepoint stitchery, the burdened warp and woof threads of the canvas must be machine stitched to hold the worked threads in place and provide needlepoint stitch retention. Thereafter, the wide safety border area or band of canvas must be attended to. Edge raveling becomes an even greater problem when the ultimate shape of the needlepoint piece is not rectangular with its edges not in parallel with warp and woof threads.

Canvas distortion, stretching, sagging, extension and creep constitute major problems to persons performing needlepoint stitchery. If one closely observes needlework canvas as needlepoint stitchery is applied, it becomes obvious that the vertical and horizontal forces applied to the canvas threads (defining each aperture in the canvas) by the yarn-guiding needle and the yarn itself (as they pass through such apertures) are unequal. The absence of highly controlled and uniform yarn pull results in a wide variance of forces applied to the canvas threads and causes shifting, crunching or tauting of the threads and causes differences in aperture size and configuration throughout the canvas with the ultimate result that the canvas and stitchery design becomes distorted. Although canvas manufacturers have attempted to reduce the distortion problem through the weaving of mono-interlock canvases and by the application of sizing (stiffening) agents to the canvas threads, the problem remains. Distortion correction, after completion of the needlework piece, by straightening or "blocking" the base canvas (and the needlework it bears) must overcome many built-in failure factors. Blocking, a somewhat costly procedure, involves the stretching and straightening of the needlework to its pre-stretched size and shape. Even when the needlework piece is affixed at its edges after blocking, the blocked piece may creep back to a distorted shape over a period of time, and further blockings (if attempted) will yield unpredictable results.

It is an object of the present invention to provide an improved needlepoint canvas material which is non-distortable and dimensionally stable throughout the application thereto of needlepoint stitchery.

It is a further object of the invention to provide an improved needlepoint canvas material that is dimensionally stable yet displays adequate flexibility and manipulatability for the needlepoint artisan.

It is still a further object of the invention to provide an improved needlepoint canvas material that maintains its structural integrity with respect to uniformity of aperture size and configuration throughout its manipulation during the application of needlepoint stitchery.

It is another object of the invention to provide an improved needlepoint canvas material that does not ravel at its edges during its manipulation and the application of needlepoint stitchery thereto.

It is still another object of the invention to provide an improved needlepoint canvas material which does not require blocking after the completion of the needlepoint work.

It is yet another object of the invention to provide an improved needlepoint canvas material which may be cut into non-rectangular regular shapes and an unlimited variety of irregular shapes and sizes without concern for edge raveling and with the material capable of accepting needlepoint stitchery to the last complete holes or apertures and thus to the edges thereof.

Another object of the invention is to provide an improved needlepoint canvas material which, although manufactured in typical bolt widths, may be machine cut into relatively long, narrow, selvage-free strips for spooling and marketing without concern for edge raveling during its manipulation and the application of needlepoint stitchery.

Still another object of the invention is to provide an improved needlepoint canvas material which may be cut into shapes that are free-standing and thus may have needlepoint stitchery applied as a total design to the shapes without requiring surrounding and tedious background stichery.

It is still another object of the invention to provide an improved needlepoint canvas material that readily accepts and fully supports heavily detailed needlepoint or mixed media cross-stitch designs and patterns regardless of the open aperture mesh gauge of the material.

A still further object of the invention is to provide a unique method for producing a needlepoint canvas material which is non-distortable and dimensionally stable, which does not require the application of excessive, yarn-damaging sizing compounds, which does not ravel at its edges during its manipulation and the application of needlepoint stitchery, and which does not require blocking after the completion of the needlework.

Other objects and advantages of the invention will be apparent from the following detailed description of the invention, taken together with the accompanying drawings.

SUMMARY OF THE INVENTION

The present invention relates to an improved needlepoint canvas material and the methodology for producing such material. The needlepoint canvas material of the invention is a flexible, non-distortable composite laminated sheet material comprised of a primary layer of non-elastic, open-mesh woven needlepoint fabric which has bonded to one of its faces a relatively thin, non-elastic secondary mesh-stabilizing layer of sheer fabric. The primary layer is preferably a mono-floating or mono-interlock needlepoint canvas material having uniformly sized and spaced mesh holes or apertures between the threads of the canvas with such apertures being equal to or larger in size than the threads themselves. Alternatively, the primary layer may be double thread needlepoint canvas material having principal holes or apertures and smaller holes or apertures. The threads of the open-mesh woven primary layer, in accordance with the invention, are impregnated and coated with a synthetic resin mesh-stiffening or sizing material such as polyvinyl acetate.

The sheer fabric secondary layer of the composite laminated needlepoint canvas material is preferably a non-woven, semi-transparent, random-spun synthetic fiber material or a sheer closely woven fabric material. The sheer fabric secondary layer is bonded to the open-mesh primary layer by the synthetic resin mesh-stiffening material of the primary layer or by a combination of such mesh-stiffening material and a synthetic adhesive material which may be applied as a liquid thermoplastic adhesive to one face of the primary layer before it is compressively interfaced with the sheer secondary layer (with the application of heat). Alternatively, the liquid thermoplastic adhesive may be applied to one face of the sheer secondary layer before it is compressively interfaced with the open-mesh primary layer. As a still further alternative, the sheer secondary layer may have built-in adhesive properties which cooperate with the adhesive properties of the mesh-stiffening material of the primary layer to bond the secondary layer to the primary layer. Where the sheer secondary layer has built-in adhesive properties, such layer is preferably a thin fabric material made of non-woven, random-spun thermoplastic fibers with such material being capable of softening and fusing when heated and setting when cooled.

The needlepoint canvas material of the invention, as a composite laminated sheet material having a primary layer of well accepted needlepoint canvas and a bonded secondary mesh stabilizing layer of sheer fabric, provides the needlepoint artisan with an improved needlepoint canvas material which is non-distortable because the warp and woof threads of the layer are held in truer alignment and spacing through their bonding to the secondary mesh-stabilizing layer. Further, with the threads of the primary layer material bonded at one of its faces to the sheer secondary layer, the threads do not ravel at the edges of the canvas. The secondary layer is of such a sheerness that it is semi-transparent so that the holes or apertures of the canvas layer remain distinct to the needlepoint artisan and the secondary layer is relatively thin so that it is easily penetrated in the yarn-bearing stitchery needle.

PREFERRED EMBODIMENTS OF THE INVENTION

Figure 1:
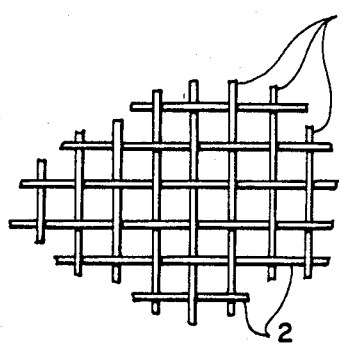
FIG. 1 is an enlarged top plan view of a segment of a typical piece of mono-floating thread woven needlepoint canvas.
Figure 2:
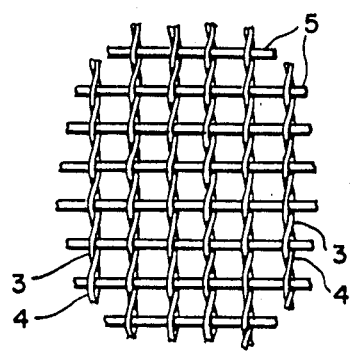
FIG. 2 is an enlarged top plan view of a segment of a typical piece of mono-interlock thread woven needlepoint canvas.
Figure 3:
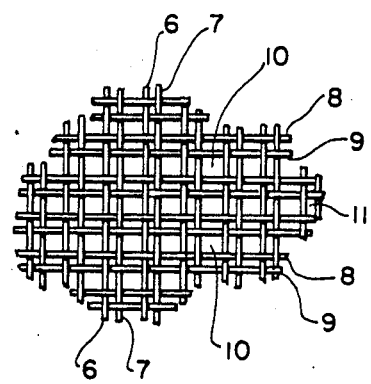
FIG. 3 is an enlarged top plan view of segment of a typical piece of double thread woven needlepoint canvas.

Referring initially to FIGS. 1, 2 and 3 of the drawing, there is shown examples of the thread and weave structure of three of the most common needlepoint canvas types, i.e., mono-floating thread canvas (FIG. 1), mono-interlock thread canvas (FIG. 2) and double thread canvas (FIG. 3). In the mono-floating canvas the warp threads 1 and the weft (woof) threads 2 are merely woven over and under each other. In the mono-interlock canvas the warp threads (in fact) comprise two smaller (weaker) threads 3 and 4 that are twisted at each over and under crossing of the weft threads 5. Double thread needlepoint canvas (FIG. 3) is woven with pairs of warp threads 6 and 7 and pairs of weft threads 8 and 9 with each pair of threads defining with other pairs of threads principal apertures 10 and with the threads of each pair of threads defining with the threads of other pairs of threads small apertures 11 of the canvas.

Figure 4:
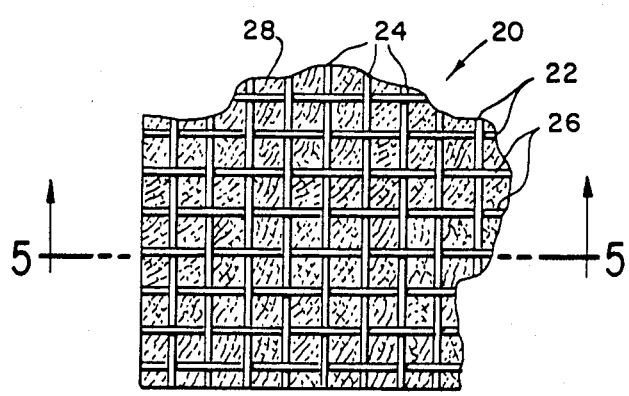
FIG. 4 is an enlarged top plan view of a composite laminated piece of the needlepoint canvas material of the present invention with the sheer non-woven, random-spun synthetic fiber secondary layer affixed to the underside of the open-mesh woven canvas primary layer of the composite material.
Figure 5:
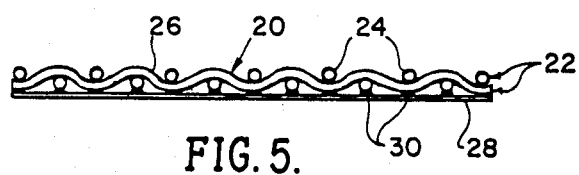
FIG. 5 is an enlarged sectional view of the needlepoint canvas material of FIG. 4 taken along line 5—5 of FIG. 4.

Referring next to FIGS. 4 and 5 of the drawing, the composite laminated needlepoint canvas material 20 of this invention comprises a non-elastic, open-mesh woven needlepoint fabric primary layer 22, comprised of warp threads 24 and weft threads 26, which was bonded to one of its faces a relatively thin, non-elastic, mesh-stabilizing secondary layer of sheer fabric material 28. The primary layer to secondary layer bonding areas 30 are formed by: (a) the adhesive quality of the synthetic resin mesh-stiffening material impregnating and coating the threads of the primary layer; (b) the combination of such mesh-stiffening material and a synthetic adhesive material applied to either the primary layer or the secondary layer as a liquid thermoplastic adhesive; or (c) the combination of such mesh-stiffening material and the adhesive properties of the fibers of the secondary layer when the secondary layer is comprised of non-woven, random-spun thermoplastic fibers. Where a synthetic adhesive material is applied to the primary layer or secondary layer it may be a hot melt, solvent based or aqueous based adhesive, particularly an adhesive having a molecular affinity for the synthetic resin mesh-stiffening material of the primary layer. It may be applied to the secondary layer as a heated sprayed-on liquid adhesive. If applied to the open-mesh primary layer it may be printed on by an engraved calender roll as a heated viscous coating to the outermost surface contact areas of the warp and weft threads over the entire interface surface of the primary layer so that bonding of the layers occurs at a uniformly distributed multiplicity of the small bonding areas 30 throughout the composite material 20 and the apertures of the open-mesh primary layer are maintained functionally free of the adhesive material.

Figure 6:
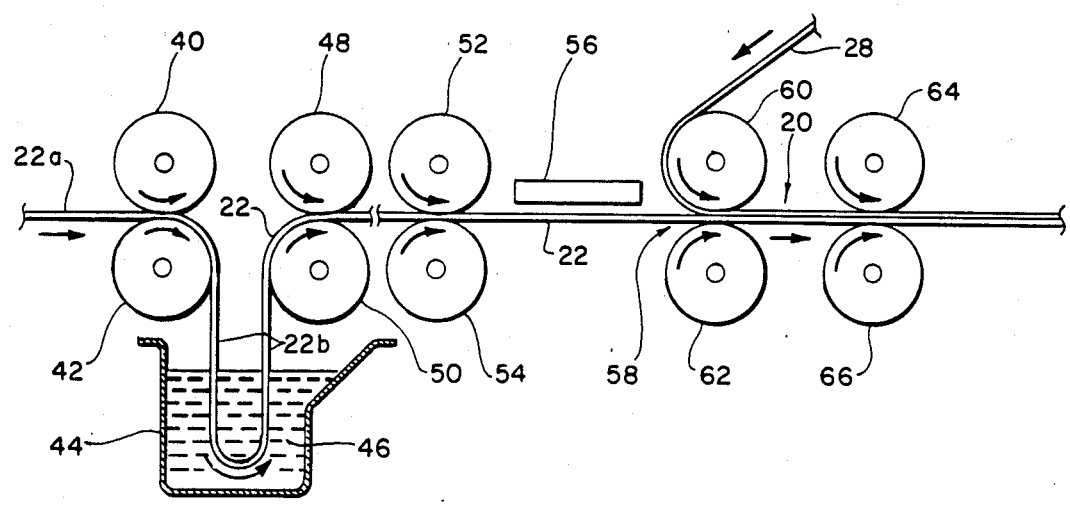
FIG. 6 is a somewhat diagramatic showing of one method of applying the sheer secondary layer to the open-mesh primary layer to form the composite laminated needlepoint canvas material of the invention.

In FIG. 6 there is illustrated, in somewhat diagramatic fashion, one version of the method of applying the sheer secondary layer to the open-mesh primary layer to form the composite laminated needlepoint canvas material of the invention as shown in FIG. 5. In accordance with the methodology illustrated in FIG. 6 a web of non-elastic, open-mesh woven needlepoint fabric 22a is fed as a primary laminate layer between web transport or guide rolls 40 and 42 and discharged beyond such rolls as a downwardly depending moving loop 22b of the open-mesh fabric. The moving loop of fabric 22b passes into, through and out of tank 44 containing heated thermoplastic fabric impregnating and coating fluid 46 of low viscosity (as described hereinafter) stiffening or sizing the open-mesh fabric. The impregnated and coated moving web of open-mesh fabric 22 is taken up by heated pressure rolls 48 and 50 and during its passage between such rolls the fabric 22 is calendered so that the warp and weft threads of the fabric at their cross-over points are compressed together for adhesion and excess impregnating and coating fluid is squeezed from the fabric. The temperature of the thermoplastic fluid 46 in tank 44 is maintained above the fluid's resin fusing point and the web 22 is maintained at such temperature by the heated rolls 48 and 50 so that the aperture of the open-mesh primary layer of fabric, forming web 22, are maintained functionally free of the thermoplastic fluid.

The web 22 is cooled to below the fusing temperature of the thermoplastic impregnating and coating fluid 46 during its forward movement between roll set 48–50 and the set of pressure rolls 52 and 54 with the consequence that the woven open-mesh fabric 22 becomes sized or stiffened by the setting of the impregnating and coating material. The web 22 is thereafter moved through a preheating station which, as illustrated in FIG. 6, may include a bank of infrared panels 56. These panels are operated to direct infrared radiation only to the upper surface of web 22 whereby the set thermoplastic impregnating and coating material on such web surface is preheated and softened. The web 22 is then directed immediately to the pressure nip 58 of a bonding station comprised of opposed rolls 60 and 62. A web of non-elastic, mesh-stabilizing sheer fabric material 28 (as the secondary layer) is fed over roll 60 and through the pressure nip 59 to interface under pressure with the web of open-mesh fabric 22 (as the primary layer) to form the composite laminated needlepoint canvas material 20 of the invention. Pressure roll 60 is heated to a precisely controlled temperature whereby as primary web 22 (with its preheated interface surface) and secondary web 28 are brought together in pressure nip 58 bonding occurs between the sheer material of web 28 and the outermost surface points of the warp and weft threads of the open-mesh fabric of web 22. The laminated canvas material 20 is thereafter fed to one or more additional pairs of opposed rotatable pressure rolls 64 and 66 at ambient temperature whereby the bonding points 30 (see FIG. 5) of such laminated material are cooled to below the fusing temperature of the impregnating and coating material of the primary open-mesh fabric 22 at such bonding points.

Figure 7:
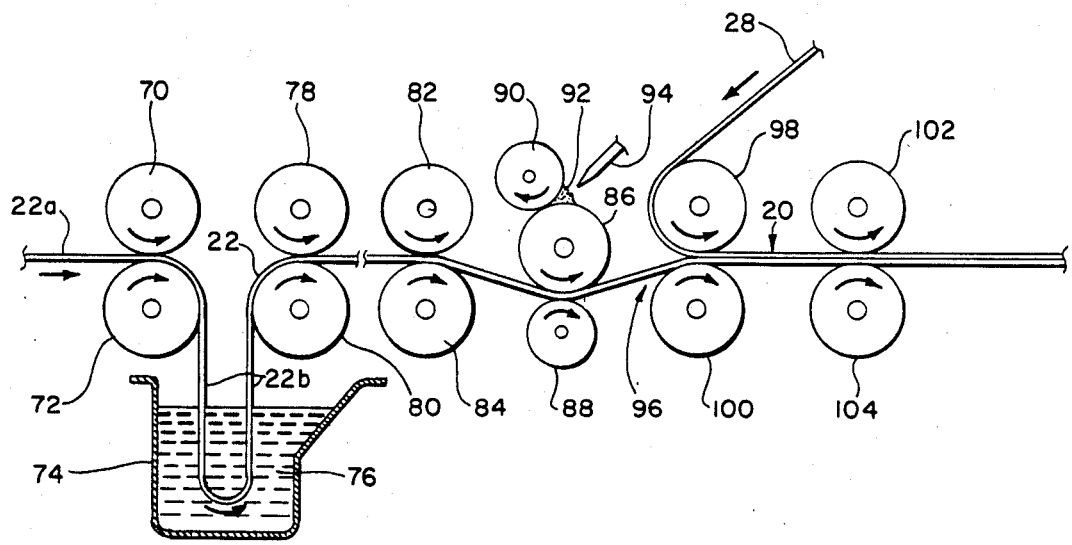
FIG. 7 is a somewhat diagrammatic showing of a second method of applying the sheer secondary layer to the open-mesh primary layer to form the composite laminated needlepoint canvas material of the invention.

In FIG. 7 there is illustrated, in somewhat diagrammatic fashion, another version of the method of applying the sheer secondary layer of fabric 28 to the woven open-mesh primary layer of fabric 22 to form the composite laminated needlepoint canvas material 20 of the invention as shown in FIGS. 4 and 5. In accordance with the methodology illustrated in FIG. 7 a web of non-elastic, open-mesh woven needlepoint fabric 22a is fed as a primary laminate layer between web transport or guide rolls 70 and 72 and discharged beyond such rolls as a downwardly depending moving loop 22b of the open-mesh fabric. The moving loop of fabric 22b passes into, through and out of tank 74 containing heated thermoplastic fabric impregnating and coating fluid 76 of low viscosity (as described hereinafter) for stiffening or sizing the open-mesh fabric. The impregnated and coated moving web of open-mesh fabric 22 is taken up by heated pressure rolls 78 and 80 and during its passage between such rolls the fabric 22 is calendered so that the warp and weft threads of the fabric at their cross-over points are compressed together for adhesion and excess impregnating and coating fluid is squeezed from the fabric. The temperature of the thermoplastic fluid 76 in tank 74 is maintained above the fluid's resin fusing point and the web 22 is maintained at such temperature by the heated rolls 78 and 80 so that the apertures of the open-mesh primary layer of fabric forming web 22 are maintained functionally free of the thermoplastic fluid.

The web 22 is cooled to below the fusing temperature of the impregnating and coating fluid 76 during its forward movement between roll set 78–80 and the set of pressure rolls 82 and 84 with the consequence that the woven open-mesh fabric 22 becomes sized or stiffened by the setting of the impregnating and coating material. The web 22 is then fed as a primary laminate layer between a heated, etched-surface roll 86 and an idler roll 88 which rotatably holds fabric layer 22 to roll 86. An upper heated roll 90 rotatably interacts with heated roll 86 to calender the laminate bonding adhesive material 92 introduced to such rolls by a suitable feed device 94. A thin heated viscous calendered coating of adhesive material is carried by roll 86 to the laminate interface surface of the open-mesh fabric 22 whereat it is applied to the outermost coated surface contact areas of the warp and weft threads of such fabric surface in a uniform printed-on pattern of minute adhesive deposit points with the apertures of the open-mesh fabric maintained functionally free of the adhesive material. After the application of adhesive material 92 to the laminate interface surface of the open-mesh fabric primary layer 22, such layer is directed immediately to the pressure nip 96 of a bonding station comprised of opposed rolls 98 and 100. A web of non-elastic, mesh-stabilizing sheer fabric material 28, as a secondary laminate layer, is picked up by roll 98 and fed to the pressure nip 96 whereat the web 28 is interfaced under pressure and precisely controlled heat to primary layer 22 to form the composite laminated needlepoint canvas material 20 of the invention. The laminated canvas material 20 is thereafter fed to one or more additional pairs of opposing rotatable pressure rolls 102 and 104 at ambient temperature whereby the laminate bonding adhesive is cooled to below its fusing temperature.

Where the composite laminated needlepoint canvas material of the invention takes the laminate form as shown in FIG. 5 and is fabricated in accordance with the methodology illustrated in either FIG. 6 or FIG. 7, the primary laminate layer 22a (prior to impregnation) may be comprised of any suitable non-elastic, open-mesh woven needlepoint fabric having a uniform pattern of mesh apertures between the threads of the fabric with the apertures being equal to or larger in size than the threads forming the fabric. The sheer fabric secondary laminate layer 28 is preferably a non-woven, semi-transparent, random-spun synthetic fiber material or a sheer closely woven fabric material. Non-woven, synthetic fiber materials of the type that may be utilized include semi-transparent, random-spun polyesters and polyamides (and mixtures of polyester and polyamide fiber) having a material weight of 0.25 to 0.80 ounce or more per square yard. The weight of the secondary layer should increase as the size of the apertures of the primary layer increase. Where an interposed layer of thermoplastic adhesive is utilized (methodology of FIG. 7) to assist in the bonding of the secondary layer 28 to the primary layer 22 such adhesive may be a hot melt, solvent based or aqueous based adhesive. Thus, latex based and acrylic, polyester and polyamide based adhesives, along with a variety of other thermoplastic synthetic adhesives, are suitable for bonding the secondary layer 28 to the primary layer 22. Depending upon the particular adhesive, the bonding temperature will be within the range of ambient temperature to 450° F. and the viscosity of the adhesive will be within the range of 500 to 5,000 centipoise. The interposed layer of adhesive may be applied in printed on fashion to the primary layer 22 as illustrate in FIG. 7 or may be sprayed onto the secondary layer 28 before it is interfaced with primary layer 22.

The methodology of the invention as illustrated in FIGS. 6 and 7 shows the impregnation and coating of the primary woven laminate layer 22a by passing a web of such primary layer material through a single bath or tank 44 or 74 containing the heated thermoplastic fabric impregnating and coating fluid 46 or 76. In a number of instances (depending on the ability of the thread material to absorb the impregnating fluid, thread denier and mesh size of the fabric) the impregnation and coating of the primary layer 22a may require the passage of the web of such layer through two or more baths of the thermoplastic fabric impregnating and coating fluid to attain the desired degree of stiffening or sizing of the woven primary layer. The impregnating and coating fluid may be selected from a variety of thermoplastic resin based materials including polyvinyl acetate, vinyl-/acrylic copolymer and polyvinyl chloride and may take the form of emulsions, plastisols, organisols and hot melts. These resin based impregnating and coating materials have a molecular affinity for any interposed layer of adhesive and the non-woven, random-spun synthetic fiber secondary layer materials when used to form the composite material of the invention and improve the laminate bonding characteristics of such material. Also, a wide range of impregnation bath temperatures may be employed (up to about 230° C.).

EXAMPLE I

A broad selection of composite laminated, non-distortable needlepoint canvas materials have been fabricated in accordance with the invention in yardage quantities. For example, a most suitable composite canvas material for needlepoint stitchery is prepared utilizing commercially available non-elastic, cotton thread open-mesh, mono-floating weave, 12 gauge (unsized) needlepoint canvas material weighing 4.0 ounces per square yard and having an average thickness of 0.03 inch. A web of such woven material, as a primary laminate layer, is impregnated and coated with heated thermoplastic polyvinyl acetate emulsion polymer through immersion treatment in a sequence of two baths of the polymer. After the impregnation and coating treatment to stiffen or size the primary layer web such web is compressed under the pressure of opposing calender rolls and cooled to set the polymer. Following the setting of the fabric stiffening polymer, the impregnated and coated primary laminate layer (weighing 5.0 ounces per square yard) is surface heated on the side of the layer to be interfaced with a mesh-stabilizing secondary layer of sheer fabric material to soften the polymer coating to reactivate the adhesive characteristics of such coating. Finally, the surface heated primary layer of polymer impregnated and coated open-mesh fabric is interfaced under pressure with a secondary layer of commercially available non-elastic, non-woven, semi-transparent, spunbonded polyester synthetic fiber material weighing 0.5 ounce per square yard with the softened polymer coating on the primary layer acting as an adhesive to bond the secondary layer to the primary layer. The resulting composite laminate material is cooled to reset the polymer with such composite material having an average thickness of 0.034 inch and having a weight of 5.5 ounces per square yard.

EXAMPLE II

As another example of the composite laminated, non-distortable needlepoint canvas material of the invention, a primary layer of woven cotton thread open-mesh, 12-gauge needlepoint fabric (as described in the previous example) is impregnated and coated in a single immersion treatment with polyvinyl acetate polymer. The sheer secondary layer of the composite is comprised of commercially available non-elastic, non-woven, semi-transparent, spunbonded polyamide synthetic fiber material weighing 0.4 ounce per square yard. A preheated emulsion of thermoplastic based adhesive is utilized to assist in the bonding of the secondary layer to the primary layer. The hot adhesive is applied to the outermost surface areas of the warp and weft threads on the laminate interface side of the primary layer by an engraved, heated calendering roller. Approximately 0.3 ounce of adhesive is utilized per square yard of the primary layer material. The open-mesh primary layer, with adhesive thereon, is thereafter interfaced with the sheer secondary layer and laminated under pressure by passage through a pair of opposing heated rolls. The hot thermoplastic based adhesive and softened, reactivated polyvinyl acetate polymer coating on the woven primary layer combine to bond the sheer non-woven secondary layer to the open-mesh woven primary layer. The resulting composite laminate material is cooled to set the thermoplastic based adhesive and reset the coating polymer with such composite material having an average thickness of 0.034 inch and having a weight of 5.1 ounces per square yard.

The unique composite needlepoint canvas material of the above examples is non-distortable when needlepoint stitchery is applied and the material exhibits no edge raveling when cut into a variety of rectangular and irregular shapes. Further, the materials are easily machine cut into narrow ravel-free strips.

From the foregoing description of the present invention, examples of articles of manufacture embodying the invention and the accompanying drawing figures, it will be apparent that there has been disclosed a unique composite laminated needlepoint canvas material. The composite material is non-distortable and dimensionally stable because the warp and weft threads of the primary open-mesh canvas layer are kept in proper alignment by their bonded relationship to the sheer non-elastic mesh-stabilizing secondary layer of fabric material whereby uniformity of the size, alignment and configuration of the apertures of the open-mesh canvas is maintained throughout the material. Although non-distortable and dimensionally stable, the composite material displays appropriate flexibility and manipulatability for the needlepoint artisan. Because of the bonding of the warp and weft threads of the primary open-mesh canvas layer to the mesh-stabilizing secondary layer, the composite canvas material of the invention does not ravel at its edges before, during or after the application of needlepoint stitchery thereto. Further, the unique composite laminated material does not require blocking after the completion of the needlepoint work because the material is substantially non-distortable. The composite material, with needlepoint stitchery applied, is washable and may be cleaned by common dry cleaning chemicals without experiencing harmful effects or shrinkage. Although the material may lose some of its stiffness during its washing in warm water (impregnating resin softens), it regains its stiffness after washing as the material cools and the resin resets.

The disclosed improved composite laminated needlepoint canvas material, although produced in bolt quantities of common widths, does not require that the selvage edges of the primary open-mesh canvas layer be retained to inhibit raveling. In fact, the composite material is fabricated utilizing bolt widths of the primary canvas layer from which the selvage areas have been removed. Removal of the selvage edges also eliminates aperture distorts in the area of the selvages. Because the composite material does not ravel, it may be readily cut into an unlimited variety of regular and irregular shapes and sizes with the cut material capable of accepting needlepoint stitchery to the last complete holes or apertures and thus to the edges thereof. In addition, the material may be die cut at the time of its manufacture into popular design shapes or machine cut at such time into relatively long, narrow, selvage-free strips for separate spooling in a wide variety of widths, even widths down to about one inch. Thus, long strips of the material may be spooled in a variety of pre-cut widths for use in making long decorative (sag-free) popular bellpull and tapestry pieces, belts and bands bearing needlepoint stitchery, and the like, without requiring that the needlepoint artisan make long careful cuts by hand along warp or weft threads as with prior needlepoint canvas materials. Further, long strips of the composite needlepoint canvas material may be cut from bolt material along the "straight-of-the-grain" of the material (the so-called north-south direction of the primary layer of open-mesh woven material and the direction parallel to the original selvages of such layer) to obtain strips of maximum strength and free of gravity sag (north-south, wrap-aligned cut strips are classically stronger than east-west, weft-aligned cut strips) without wasting large quantities of the bolt or yardage material along, and adjacent to, the length of the strips. In general, the capability of providing pre-cut, spooled, selvage-free, non-raveling needlepoint canvas material provides the needlepoint artisan with a unique material in sub-bolt, warp-aligned widths that can be quickly, easily and accurately cut east-west (weft aligned) of the material grain.

In addition to unique strip forms of the composite needlepoint canvas material of the invention, the material may be cut into shapes that are free-standing and thus may have needlepoint stitchery applied as a total design to the edges of the shapes without requiring surrounding and tedious background stitchery. Also, the composite laminated material is better able to support mixed-media craftwork in that, in addition to needlepoint stitchery, it may accept heavy beadwork in adjacent and abutting design areas without causing sagging of the canvas threads and material distortion.

The non-elastic, mesh-stabilizing secondary layer of sheer fabric material, which is bonded to the open-mesh primary layer, provides additional unique features to the composite laminated needlepoint canvas material of the invention. The sheer secondary layer is semi-transparent so that the apertures of the primary open-mesh layer remain distinct to the needlepoint artisan and the secondary layer is extremely thin so that its fibers or threads do not inhibit the manipulation of the yarn-bearing needle through the apertures or the pull of the yarn therethrough.

The sheer secondary layer may be bulk color tinted prior to lamination to provide color contrast with respect to the threads of the primary layer so that the apertures of the primary layer in effect are framed and stand out to promote eye-ease, i.e., the air spaces of the primary layer canvas are in effect colorable. Light pre-tinting of the secondary layer does not limit its sheerness and semi-transparency. Alternatively, as means for providing color contrast and framing of the apertures, the primary layer of canvas can be pre-colored (coloration of the thread used in weaving the canvas) to contrast with an untinted or contrast tinted sheer secondary layer. In bulk form both the primary layer and the secondary layer can be pre-color matched with the sheerness of the secondary layer providing the desired contrast between such layers.

Most importantly, the presence of the sheer secondary layer provides a full surface effect to both faces of the composite laminated needlepoint material with each face of such material readily accepting fully detailed needlepoint, mixed-media or cross-stitch designs, patterns or decalcomania, regardless of the open aperture mesh gauge of the primary layer. This now provides the needlepoint artisan with two means of framing the apertures of the primary layer, i.e., viewing the apertures from the primary layer side of the composite material and therethrough to the contrasting sheer secondary layer, or viewing the apertures from the secondary layer side through the contrasting sheer secondary layer. Thus, the laminated needlepoint material of the invention, on either or both of its faces, accepts detailed designs applied by paints, marking pens, inks, crayons and a wide variety of iron-on transfer patterns, decalcomania, cross-stitch transfers or dressmaker type carbon sheets and fabric dyes. Such detailed design means and methods of designs make it possible to align to a precise fractional thread count because of the total colorable surface of the secondary layer and the warp and weft threads of the material are held in regular, nondistortable arrangement of apertures of the primary open-mesh layer of the material. The unique material of the invention thereby eliminates the need for the present costly state-of-the-art tedious hand painting of the individual canvas threads to achieve exact design alignment and color coverage. The various color tintings of the sheer secondary layer and coloring of the threads of the primary layer also helps to cost-effectively eliminate canvas "grin through" where the needlepoint yarn does not fully cover the canvas threads and spots of canvas are visible between the stitches. In addition, the sheer secondary layer may be pre-printed with needlework guiding grids and measurement indicia (including numbers, lines and regularly spaced color symbols) so that precise design layouts may be easily made and design enlargement or miniaturization may be accomplished on the fabric itself. Such preprinted integral grids and indicia substantially eliminate the need for separate measuring grids and devices and graphs and charts that require tedious back and forth reference and counting of stitches.

In the specification and drawing figures there has been set forth preferred embodiments of the invention and although specific terms have been employed, they are used in a generic and descriptive sense only and not for purposes of limitation, the scope of the invention being defined in the following claims.

What is claimed is:

1. A method of producing a composite laminated, non-distortable needlepoint canvas material which comprises:

(a) impregnating and coating a primary layer of non-elastic, open-mesh woven fabric material having a uniform gridwork pattern with mesh apertures with a synthetic resin mesh-stiffening material having adhesive properties;

(b) assembling the resin impregnated and coated primary layer of woven fabric material and a relatively thin secondary mesh-stabilizing layer of sheer non-elastic fabric material;

(c) applying heat and pressure to the assembly of said primary layer and said secondary layer to soften the synthetic resin coating of said primary layer and bond said secondary layer to said primary layer to form said composite laminated canvas material; and (d) cooling said composite laminated canvas material to ambient temperature to cure the synthetic resin material forming the bond between said secondary layer and said primary layer.

2. A method of producing a composite laminated, non-distortable needlepoint canvas material as claimed in claim 1 wherein the synthetic resin mesh-stiffening material for impregnating and coating the primary layer of woven fabric material is polyvinyl acetate.

3. A method of producing a composite laminated, non-distortable needlepoint canvas material as claimed in claim 1 wherein the synthetic resin mesh-stiffening material coating the primary layer of woven fabric material on the side of said primary layer interfacing with said secondary layer is heated to soften said coating material before the assembly of said primary and secondary layers.

4. A method of producing a composite laminated, non-distortable needlepoint canvas material which comprises:

(a) impregnating and coating a primary layer of non-elastic, open-mesh woven fabric material having a uniform gridwork pattern with mesh apertures with a synthetic resin mesh-stiffening material having adhesive properties;

(b) assembling the resin impregnated and coated primary layer of woven fabric material and a relatively thin secondary mesh-stabilizing layer of sheer non-elastic fabric material with an interposed layer of synthetic resin adhesive;

(c) applying heat and pressure to the assembly of the primary layer of woven fabric material, and secondary layer of sheer fabric material and said interposed layer of synthetic resin adhesive to soften said synthetic resin mesh-stiffening material coated on the woven fabric of said primary layer and the interposed layer of synthetic resin adhesive and bond said secondary layer to said primary layer in part by said coated mesh-stiffening material and in part by said resin adhesive to form said composite laminated canvas material; and (d) cooling said composite laminated canvas material to ambient temperature to cure the synthetic resin mesh-stiffening material and synthetic resin adhesive forming the bond between the secondary layer and said primary layer.

5. A method of producing a composite laminated, non-distortable needlepoint canvas material as claimed in claim 4 wherein the interposed layer of synthetic resin adhesive is a heated liquid thermoplastic resin adhesive and is interposed between said primary layer and said secondary layer by coating said heated liquid adhesive on the side of said primary layer interfacing with said secondary layer before the assembly of said primary and secondary layers, said coating of said heated liquid adhesive on said primary layer being only applied to the threads of said primary layer in the areas of their interfacing contact with said secondary layer whereby the apertures of said primary layer remain functionally free of said adhesive after said secondary layer is bonded to said primary layer.

6. A method of producing a composite laminated, non-distortable needlepoint canvas material as claimed in claim 4 wherein the interposed layer of synthetic resin adhesive is a heated liquid thermoplastic resin adhesive and is interposed between said primary layer and said secondary layer by spraying said heated liquid adhesive on the side of said secondary layer interfacing with said primary layer before the assembly of said primary and secondary layers.

7. A method of producing a composite laminated, non-distortable needlepoint canvas material as claimed in claim 4 wherein the synthetic resin mesh-stiffening material for impregnating and coating the primary layer of woven fabric material is polyvinyl acetate.

8. A method of producing a composite laminated, non-distortable needlepoint canvas material as claimed in claim 4 wherein the heated liquid thermoplastic resin adhesive forming said interposed adhesive layer is selected from the group comprising hot melt, solvent based and aqueous based thermoplastic adhesives.

9. A method of producing a composite laminated, non-distortable needlepoint canvas material as claimed in claim 4 wherein the heated liquid thermoplastic resin adhesive forming said interposed adhesive layer is selected from the group comprising latex based, acrylic based, polyester based, polyamide based and vinyl based thermoplastic adhesives.

* * * * *